Aug. 2, 1966 A. B. ANDREWS ETAL 3,263,608
ALUMINUM-AMMONIUM NITRATE EXPLOSIVE WITH
NITROHYDROCARBONS AND SEISMIC PROCESS
Filed July 17, 1964 4 Sheets-Sheet 1

INVENTORS
Alday B. Andrews
Charles D. Forrest
Frank A. Loving, Jr.

BY

Aug. 2, 1966  A. B. ANDREWS ETAL  3,263,608
ALUMINUM-AMMONIUM NITRATE EXPLOSIVE WITH
NITROHYDROCARBONS AND SEISMIC PROCESS
Filed July 17, 1964  4 Sheets-Sheet 2

INVENTORS
Alday B. Andrews
Charles D. Forrest
Frank A. Loving, Jr.
BY

INVENTORS
Alday B. Andrews
Charles D. Forrest
Frank A. Loving, Jr.

INVENTORS
Alday B. Andrews
Charles D. Forrest
Frank A. Loving, Jr.
BY

United States Patent Office 3,263,608
Patented August 2, 1966

3,263,608
ALUMINUM-AMMONIUM NITRATE EXPLOSIVE WITH NITROHYDROCARBONS AND SEISMIC PROCESS
Alday B. Andrews, Woodbury, Charles D. Forrest, Westville, and Frank A. Loving, Jr., Wenonah, N.J., assignors to E. I. du Pont de Nemours and Company, Wilmington, Del., a corporation of Delaware
Filed July 17, 1964, Ser. No. 383,288
8 Claims. (Cl. 102—23)

This invention relates to improvements in the art of seismic prospecting. More particularly, the invention is concerned with improvements in explosive charges for generation of seismic waves in the earth's crust, and with improvements in the offshore method of seismic prospecting that are achievable therewith.

In seismic prospecting or exploration, which is employed as an aid in locating subterranean mineral deposits, including potential oil- and gas-bearing strata, use is made of the phenomenon that acoustical energy, introduced into the elastic crust of the earth, will be reflected and refracted by subterranean structures whenever there is an acoustic mismatch, or difference in resistance, between adjacent layers of the structure. The time intervals required for the acoustic or seismic waves to travel from their point-source down into the earth and back to the surface as reflected and refracted waves are used in assessing the depths of the subterranean strata and also their contours. The return waves are picked up by sensitive acoustic wave detectors, i.e., geophones or hydrophones, that are capable of converting the signals received to electrical energy. Following amplification, these electrical impulses are recorded by means of seismographs for future evaluation and interpretation.

Various sources of acoustical energy have been used in seismic prospecting over the years, including dropping of heavy weights on land, discharge of electric sparks under water, and firing of various types and configurations of explosive charges above or below the surface of the ground and under water. Explosive generation of acoustic or seismic waves is most common in present-day seismic explorations.

In "offshore" seismic prospecting, a type of exploration of underwater formations conducted particularly in coastal regions, i.e., along continental shelves, the explosive charge, e.g., 60% gelatin dynamite or, as has been common practice in more recent years, an explosive of the nitro-carbonitrate class in a waterproof container, is positioned and detonated a few feet below the surface of the water. The depth at which the charge is detonated ordinarily is limited to relatively shallow levels in order to avoid any interfering "bubble pulses" in the seismic record. Such interfering pulses appear when the bubble or globe of gaseous detonation products is formed at a depth such that the bubble fails to break through the surface of the water before the internal (gas) pressure of the expanding bubble falls below the prevailing hydrostatic pressure. Under these conditions, the expansion period is followed by deceleration of the moving water to null and by a period of bubble contraction, again governed largely by the pressure dynamics. Depending primarily on the depth at which detonation occurs, such oscillatory expansion and contraction can occur one or more additional times before the bubble breaks the water surface. A good practical approximation of the maximum depth at which an explosive charge ordinarily should be detonated to avoid such bubble pulses in offshore seismic prospecting is obtained by applying Lay's formula [1]: $d = 3.8 w^{1/3}$, where $d$ is the maximum depth

[1] R. L. Lay, Geophysics X, 467–471 (1945). More precise values can be obtained, if desired, by considering additional parameters affecting the motion of the gas sphere or bubble, as detailed in chapter 8 of "Underwater Explosions," by R. H. Cole, Princeton University Press (Princeton, N.J.), 1948.

in feet at which the charge is to be submerged when $w$ is the charge weight in pounds. In actual practice, however, the charges often are submerged to a depth less than the maximum allowed by Lay's formula.

The initial distribution of acoustical energy from an explosive charge covers a wide range of frequencies, i.e., from a few cycles per second up to several thousand cycles per second, the exact frequency distribution depending on the type of explosive and the conditions and materials pertaining in the region of its initiation. However, as this energy is transmitted through the earth, in some cases through an intervening body of fluid (air or water), the higher-frequency waves tend to be attenuated by absorption and scattering in the media through which they pass to a much greater extent than do the lower-frequency ones. Hence, whether the explosive charge is fired above the earth's surface, in a shot hole underground, or in a body of water covering a formation of interest, matching of acoustical energy input with energy return generally is concerned only with frequencies up to a few hundred cycles per second and usually only with the frequency band of about 2 to 100 cycles per second. Depending on the area being explored and the type of return waves of interest, i.e., reflected or refracted, even narrower portions of the 2–100 cycles per second band are used in the matching, all other frequencies being screened out by means of appropriate filters.

The energy in the low-frequency band of interest in seismic prospecting that is generated by an underwater explosion is directly related to the impulse of the pressure wave generated in the water by the explosion. According to R. H. Cole (op. cit.), a convenient approximation to the form of an underwater shock wave produced by a detonating explosive is provided by the expression:

$$P(t) = P_0 e^{-t/\theta}$$

where $P(t)$ is the amplitude of the wave at a given time, $t$, after the initial rise, $P_0$ is the maximum amplitude of the wave, and $\theta$ is the characteristic time during which the pressure falls to $1/e$ of its value. $P_0$ and $\theta$ each depend on the nature of the explosive, its weight in a given charge, and the distance from the charge at which $P(t)$ is measured. To simplify the consideration, both the charge weight of explosive and the distance from the charge at which measurements are made are taken equal for all comparisons. Under these conditions, the impulse, $I$, of any given explosive is defined to be:

$$I = \int_0^\infty P(t) dt = P_0 \theta$$

In addition, the Fourier transform of the pressure function can be obtained to give the energy flux spectral density of the pressure pulse:

$$E(f) = \frac{P_0^2 \theta^2}{\rho c (1 + 4\pi^2 f^2 \theta^2)}$$

where $\rho$ is the density of the medium (water), $c$ is the velocity of sound in the medium, and $f$ is the frequency. Two properties of the spectrum are useful in simplifying a study of the energy flux:

(1) when $f \ll 1/\theta$ $$E(f) = P_0^2 \theta^2 / \rho c = \text{constant} = E(0)$$

and (2) $\qquad E(0) = (P_0 \theta)^2 / \rho c = I^2 / \rho c$

Consequently, the energy in the seismic frequency band is directly proportional to the square of the impulse, $I$. An ability to alter the composition of a given weight of explosive so that the product $P_0\theta$, and hence I, is increased will therefore provide increased useful seismic energy.

The practical advantages arising from an ability to increase the shock wave impulse and hence the acoustical energy generated and returned in the seismic frequency band are several. In offshore seismic prospecting, for example, the ability can be applied to reduce the weight of explosive charge needed to produce seismic signals of a given strength. This weight reduction is significant from several points of view. More charges can be loaded in a boat of given capacity for transport to the shooting location, which often is remote from land supply depots. An effective limit frequently is imposed on periods of shooting by the number and capacity of available supply vessels. In some areas, prolonged periods of story weather and choppy seas also severely limit the time during which the shooting can safely or usefully be done, and hence require the best possible utilization of days during which the weather is good. Any reduction in the unit weights of explosive charges effective for seismic prospecting also generally facilitates their transport and handling both on land and at sea.

This invention provides explosive compositions that give seismic waves of higher energies, per unit weight of explosive, than have been achievable with explosives known and used heretofore in seismic prospecting. More specifically, the improved explosive compositions of the instant invention permit a reduction in the weight of explosive charge needed to produce a given impulse and a given seismic energy return, especially in seismic prospecting in land covered by water, and thereby provide for considerable and significant improvements in seismic prospecting, particularly in the offshore method of exploration.

The improved explosive compositions for seismic prospecting provided by this invention comprise uniform blends of (a) about from 40 to 85% by weight of particulate ammonium nitrate; (b) about from 10 to 50% by weight of particulate aluminum; (c) up to about 5% by weight of hydrocarbon; and (d) about from 1 to 10% by weight of nitro compound selected from the mono nitro and dinitro benezene hydrocarbons, the sum of the weights of components (c) and (d) constituting about from 2 to 15% of the total composition. The explosive compositions of the invention are further characterized by a density of at least 1.0 gram per cubic centimeter and a detonation sensitivity such that an initiating impulse greater than that produced by a No. 8 blasting cap is required for detonation thereof.

The ammonium nitrate used in the explosive compositions of this invention can be in any desired particulate or divided form that allows uniform dispersion thereof, e.g., grains, flakes, whole and partly crushed prills and the like. Generally, the most satisfactory results, in terms of reliable detonatability of the products, are achieved when substantially all the ammonium nitrate particles are below about 3000 microns (3 mm.) in size. Preferably not more than about 5% of the ammonium nitrate is in the form of fines, i.e., particles below about 50 microns in size. (By particle size as used herein is meant weighted average particle size, based on standard sieve analyses.) Since, as has been stated, it is necessary for the instant explosive compositions to have a density of at least 1.0 gram per cubic centimeter, particulate forms of ammonium nitrate that have a bulk density of at least about 0.9 gram per cubic centimeter preferably are used. Mixtures of relatively fine ammonium nitrate particles having a bulk density above 0.90 gram/cc., usually about from 0.92 to slightly above 1.0 gram/cc., with coarser particles of slightly lower bulk density, i.e., approximating 0.90 gram/cc., are particularly preferred and give optimum results. In general, blends of fine and coarse ammonium nitrate in which the coarse particles constitute about from 10 to 50% and, more particularly, about from 25 to 35%, of the total ammonium nitrate provide explosive compositions having densities above 1.0 gram/cc., usually on the order of 1.1 grams/cc. or higher. The coarse particles also are characterized by particle sizes of about 350 microns or larger, whereas the finer and denser ammonium nitrate particles are generally smaller than 350 microns in size and have a portion of the particles, usually at least 15% and generally 40 to 60% or more, below about 150 microns in size.

The ammonium nitrate used to prepare the instant explosive compositions will be material that is substantially free of water, i.e., that contains less than 0.5% water and preferably 0.1% or less. If desired, the ammonium nitrate can have the small percentages of inert or petroleum-based coatings conventionally used to impart resistance to caking and particle disintegration during manufacture and storage.

With respect to particulate forms of aluminum employed in the explosive compositions of the instant invention, it is preferred to have a maximum of about 5% of the particles below about 25 microns in size, in order that the compositions not be rendered liable to initiation by blasting caps or other explosive initiators of equivalent strength. The aluminum also should be in a form sufficiently particulate or divided to permit preparation of uniformly blended products. As is illustrated more fully hereinafter, explosive compositions of satisfactory seismic performance are achieved by utilizing relatively fine grinds of aluminum, e.g., in which the maximum particle size is about 400 microns. However, relatively coarser aluminum particles are usually preferred. For example, as is demonstrated, part to substantially all the aluminum particles can range from about 150 microns to about 1600 microns in size, although even larger particles are not precluded. Generally speaking, seismic performance tends to be optimum when the average aluminum particle size is correlated with weight of explosive charge, so that large seismic charges contain relatively coarser metal particles than smaller ones. Thus, with the larger charges conventionally used in offshore seismic prospecting, e.g., from 16 to 50 pounds or heavier, coarse granular aluminums having an average particle size in excess of 150 microns and, preferably, about from 300 to 800 microns, provide optimum seismic performance coupled with ease of handling and minimum costs.

Independent of the grind or particle size of aluminum used, the source of the metal can vary widely. For example, the metal can be a high-grade aluminum product that normally contains as impurities only trace amounts of such metal and metalloid elements as iron, silicon, copper, magnesium, manganese, chromium, nickel, zinc, titanium, vanadium, and boron. However, the various types and grinds of scrap aluminum products that are available as by-products from the aluminum industry and contain varying, but generally larger, amounts of these and other metals as impurities are equally suitable and often more economical sources of the metal. Mixtures and alloys of other light metals, e.g., magnesium and zinc singly and in combination, can be substituted for part of the aluminum. In general, aluminum will constitute at least 50% of such mixtures and alloys, and the term aluminum, as used herein, includes not only substantially pure aluminum metal but also aluminum-containing metal alloys and mixtures in which aluminum is the predominant component.

To achieve a high impulse and attendant advantages in seismic prospecting, particularly offshore seismic prospecting, it is not only necessary that aluminum be present in the instant explosive compositions, but also that it constitute at least about 10% of the total composition weight. Aluminum concentrations below this level do not substantially improve the impulse obtained over that achievable with the aluminum-free explosives known and used heretofore for seismic prospecting. Seismically effective compositions result when the aluminum concentration is up to about 50% by weight of the total composition, but the best balance of seismic efficiency and economy is generally achieved by employing about from 10 to 30% of aluminum, and more particularly, about from 15 to 25% of the metal.

Any hydrocarbon included in the instant compositions can be of animal, vegetable or mineral origin, and can be a liquid at ambient temperatures and pressures or a solid melting below about 150° C., preferably below about 70° C. Liquid and solid petroleum hydrocarbons and fractions, such as naphthas, kerosenes, gas oils, lubricating and fuel oils, petrolatum, and paraffin waxes are particularly suitable. It is generally preferred, however, that all or a major part of the hydrocarbon normally be a liquid. The petroleum fuel oils, classified in ASTM specification D–396, and the similar but more highly refined diesel fuels, classified in ASTM D–975, are particularly preferred liquid hydrocarbons owing to their relatively high boiling points and viscosities and relatively low volatilities, although there is no requirement that the oils used in the present compositions meet the impurity concentrations for sediment, sulfur and carbon, for example, specified for fuel utility. As is noted more fully hereinafter, it is desirable for reasons of safety to choose a petroleum oil that has a flash point above the melting point of the nitro compound component used when such component is not normally a liquid and must be heated to permit uniform blending with the remaining ingredients.

The nitro compounds used in the explosive compositions will be compounds that are not classified as explosives per se. Preferably, they are ring-substituted mononitro and dinitro derivatives of benzene hydrocarbons, i.e., of benzene itself and of benzene hydrocarbons containing lower alkyl ring substituents, particularly one or more methyl substituents, such as the mono- and dinitrobenzenes, the mono- and dinitrotoluenes, the mono- and dinitroxylenes, etc. For ready and safe incorporation into the explosive compositions, the mono- and dinitro benzene hydrocarbons chosen will either be liquids under ambient conditions or will be solids having a melting point below about 150° C., preferably below about 70° C. Mixtures of mononitro and dinitro benzene hydrocarbons and their isomers also are suitable. A particularly preferred nitro compound for the instant compositions is dinitrotoluene (DNT), which can be a single isomer, but generally is one of the commercial isomeric mixtures designated by the melting point on the centigrade scale, e.g., 26° (oily) DNT or, particularly, 56° DNT.

The use of the nitro compound component in the instant compositions provides explosive charges that function with a high degree of reliability, particularly under water. Although the hydrocarbon component can be omitted, its use is preferred in most instances because it aids in providing and maintaining uniformly blended products while minimizing the amount of more costly nitro compound component needed for effective and efficient seismic charges. When the nitro component is normally melted prior to incorporation, it is preferable that any hydrocarbon used therewith have a minimum flash point at least about 100° C. higher than the nitro compound melting point. Thus, when 56° DNT is used, for example, the hydrocarbon suitably has a flash point of 150–160° C. or higher.

The combined weight of nitro component and any hydrocarbon used will constitute about from 2 to 15% of the total composition, preferably about from 3 to 10%, and more particularly, about from 7 to 8%. When used with hydrocarbon, the nitro compound component generally will amount to about from 1 to 10% of the composition weight, preferably about from 2 to 8% and more particularly, about 4 to 6%. The hydrocarbon, especially where totally liquid, will not exceed about 5% of the composition and preferably is about from 1 to 3%, particularly about 2 to 3%, of the total weight.

Preparation of the compositions of this invention is a relatively simple operation. A blender or mixer of appropriate capacity, fitted with heating means if required, is charged with the ammonium nitrate, aluminum, hydrocarbon, if any, and nitro component, with intermediate and final mixing as needed to give a uniform blend. Where the hydrocarbon and/or nitro compound are normally solids, the mixer contents are heated above the melting point of these components prior to and during their incorporation. Maintenance of an elevated temperature also facilitates discharge of the products from the mixer when fusible components are present. The compositions can be packaged in any type of container that is inherently waterproof or can be waterproofed, e.g., bags or similar containers of plastic films, waxed or paraffined paper or cardboard shells and the like. Particularly for underwater seismic prospecting, however, they preferably are packaged in metal cans or containers of similar wall strength as well as water resistance.

As stated previously, the explosive compositions of this invention are readily formulated to have a minimum density of 1.0 gram per cubic centimeter and usually have a density of 1.1 gram/cc. or higher. High density is significant when the explosive charges are to be submerged in offshore prospecting or in other wet locations, inasmuch as it avoids a need to weight down the containers or to use excessively heavy gages of metal in their fabrication.

For detonation, the explosive compositions of the instant invention require an initiating impulse greater than that produced by a No. 8 blasting cap.[1] They are, however, reliably detonatable when they are positioned in detonation-propagating relationship with a primer or booster charge of a cap-sensitive detonating explosive that exceeds the commercial blasting caps in explosive strength, e.g., charges of or based on one or more of trinitrotoluene (TNT), tetryl, pentaerythritol tetranitrate (PETN), cyclotrimethylenetrinitramine (RDX), nitroglycerin (including dynamites), and the like. As will be recognized by those skilled in the art, initiation and maintenance of detonation in charges of the instant explosive compositions depends on many factors, including the type and weight of booster or primer charge and its spacing from the main charge, the main charge weight and configuration (cross-sectional area), and the confinement afforded by the charge container plus surrounding medium. In general, it has been found that the compositions of this invention packaged in metal cans and suitably primed under water will reliably propagate a detonation in diameters of 4 inches or larger.

The compositions of this invention thus provide a high degree of safety in manufacture, storage, and transport since their detonation depends on coupling with a suitable explosive initiator and primer, which is done only immediately prior to use.

In order that advantages and utility of the instant explosive compositions in seismic prospecting may be understood more clearly, reference now is made to the accompanying drawings, in which.

---

Figure 1:
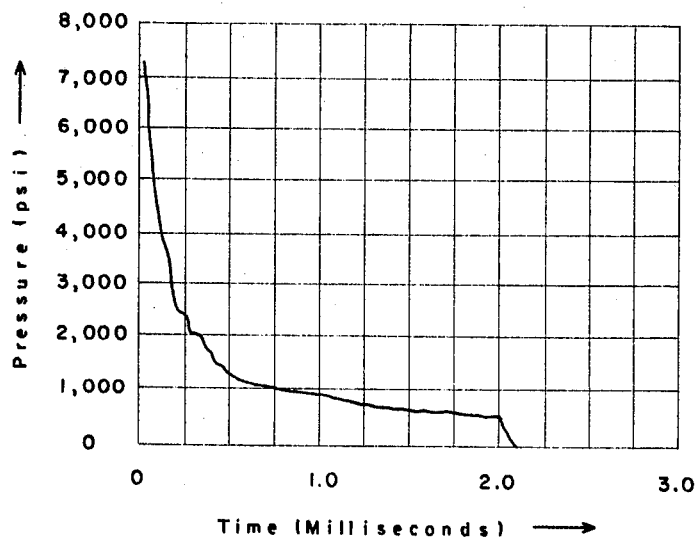
FIGURES 1 and 2 are graphical representations of actual oscilloscope traces of explosion pressures during the first 2 milliseconds after the arrival, at a pressure gage, of the shock wave from the underwater detonation of two charges of explosive composition of this invention.
Figure 1:
Figure 2:
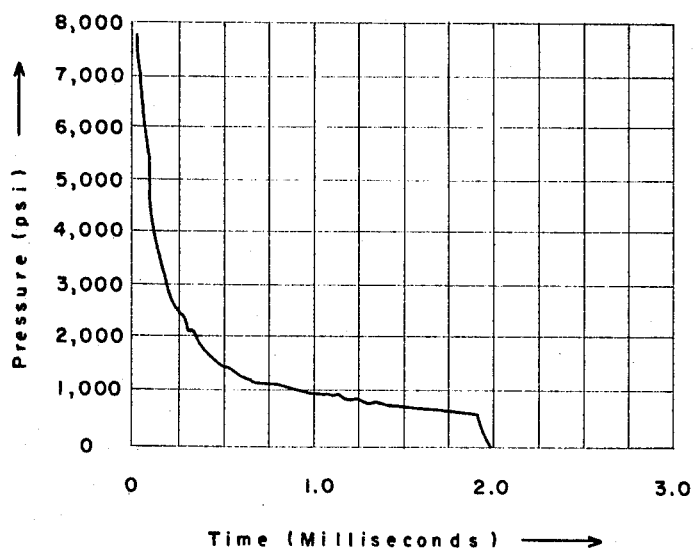
Figure 2:
Figure 5:
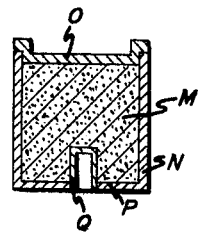
Figure 4:
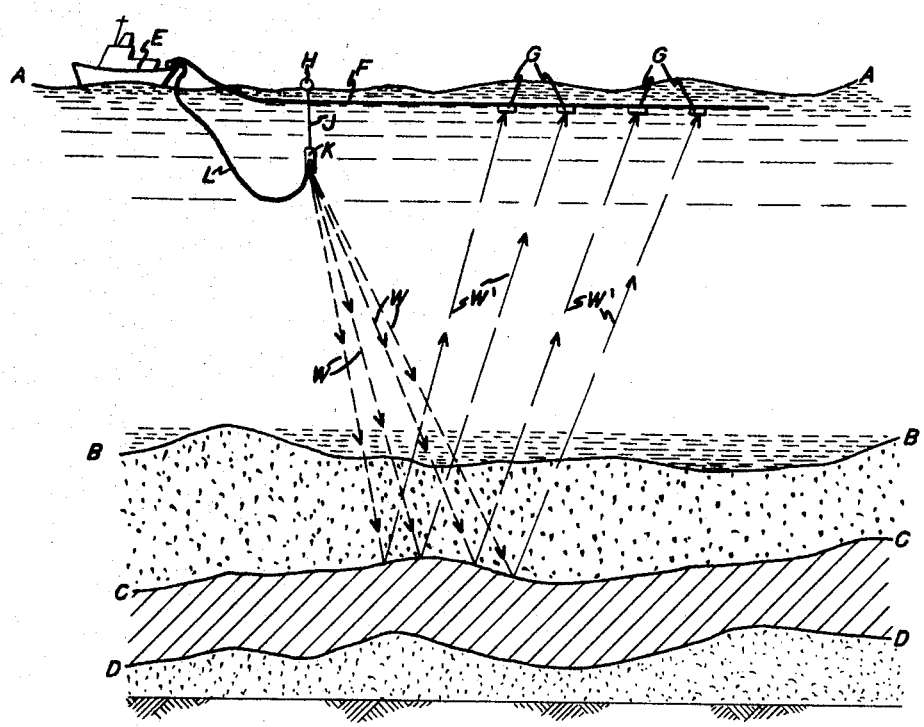

[1] No. 8 blasting caps are the strongest detonators regularly made and used commercially. As originally designated, a No. 8 cap consisted of a charge of 2 grams of mercury fulminate in a copper shell 6–8 mm. in diameter by 50–55 mm. in length. The present explosive compositions are not detonatable by this particular cap or other explosive initiators of equivalent strength.

from the underwater detonation of a charge formulated from the same components as those of FIGURES 1 and 2, except for the absence of aluminum;

FIGURE 4 is a simplified side view, partly in section, of an arrangement suitable for conducting seismic explorations in offshore loactions with charges of explosive compositions of this invention; and FIGURE 5 represents a vertical section through a package of explosive composition of this invention.

Figure 3:
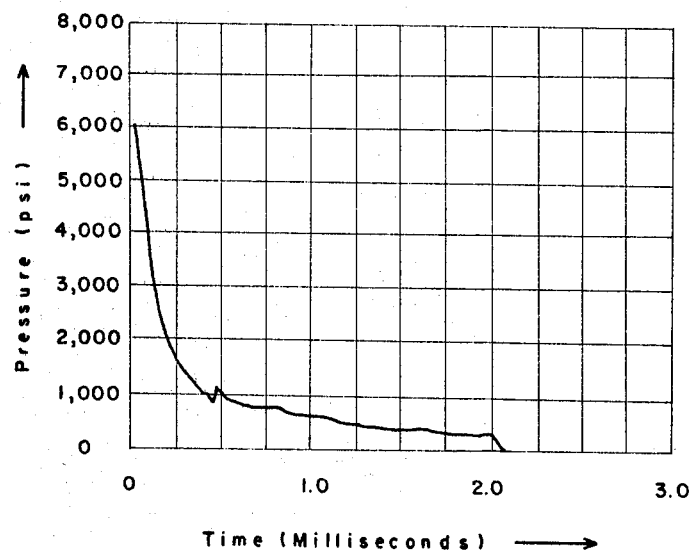
FIGURE 3 is the same type of graphical representation of the explosion pressure during the first 2 milliseconds after the arrival, at a pressure gage, of the shock wave

In FIGURES 1, 2 and 3, the charge weights used are alike in each case, as is the distance from the charges at which the pressure measurements are made. The compositions used to produce the pressure-time curves of FIGURES 1 and 2 are substantially alike, except that the charge of FIGURE 1 contains 10% by weight of particulate aluminum, whereas that of FIGURE 2 contains 20% aluminum. The increase in impulse achieved by detonating explosive compositions of the instant invention can be seen by comparing FIGURES 1 and 2 with FIGURE 3, in which the charge is similarly formulated but contains no aluminum.

In FIGURE 4, a body of water is defined by surface A—A and floor or bottom B—B; and a subterranean stratum by its upper and lower surfaces C—C and D—D, respectively. E represents a boat towing a cable F bearing a series of seismic wave detectors or hydrophones G. H is a float riding on surface A—A of the water, and J is a line, suspended from the float, to which there is fastened a submerged charge K of explosive composition of this invention, coupled with a primer charge and an electric blasting cap (not shown in the drawing). L represents electric firing leads extending from boat E to charge K. When charge K, submerged in the water substantially as shown, is detonated, a portion of the acoustic or seismic waves so generated, schematically represented by broken lines $w$, penetrate downward through the body of water and through the intervening earth below floor B—B to surface C—C of the subterranean stratum. Surface C—C returns a portion of the acoustical energy received toward the surface as reflected waves, represented by broken lines $w'$, which are detected by hydrophones G. Cable F carries the electric signals from the hydrophones back to boat E where they are amplified and recorded by seismographs (not shown).

FIGURE 5 shows in greater detail a waterproof package suitable for the instant explosive compositions. In this figure, M is a charge of explosive composition of this invention; N is a side wall, e.g., of metal, of a cylindrical container for the explosive; O is a tight-fitting lid for the container; P is the bottom of the container integral with sidewall N; and Q is a rigid tube defining a well or recess designed to hold a primer or booster charge and an electric blasting cap or other explosive initiator for effecting detonation of charge M.

The compositions of this invention and their advantages in seismic prospecting are further illustrated by the following examples. Example 1 depicts several illustrative and representative explosive compositions in accord with this invention, together with a nitro-carbo-nitrate explosive composition of a type used heretofore in seismic prospecting, for comparative purposes. Example 2 provides experimentally determined seismic performance values for several of the compositions of this invention depicted in Example 1, as well as for the comparative nitro-carbo-nitrate composition.

*Example 1*

The compositions of following Table I are prepared by blending the indicated mixtures of ammonium nitrate and aluminum with the petroleum oil; heating the resulting mass to at least 57° C. and adding and blending in the DNT for several minutes while maintaining the temperature at from 57° C. to a maximum of 71° C. The resulting uniformly blended product then is discharged from the mixer while still at an elevated temperature of about 50–55° C. and is packaged in suitable containers, such as metal cans of the aforedescribed type fitted with a well recess in one end for the primer and blasting cap initiator.

All the explosive products described in Table I have a bulk density of at least 1.15 g./cc. The particle sizes reported in the footnotes to the table are based on representative material analyses and refer to Tyler standard sieves except as otherwise noted.

TABLE I

| Formula Designation | Compositions of this Invention | | | | | | | | | Comparative Composition |
|---|---|---|---|---|---|---|---|---|---|---|
| | A | B | C | D | E | F | G | H | I | |
| Ammonium Nitrate, percent: | | | | | | | | | | |
| Coarse [a] | 28.5 | 28.5 | 25.5 | 25.5 | 18.5 | 30.0 | 22.0 | 18.5 | 15.0 | 31.7 |
| Fine [b] | 54.0 | 54.0 | 47.0 | 47.0 | 54.0 | 38.0 | 40.5 | 34.0 | 27.5 | 58.8 |
| Aluminum, percent: | | | | | | | | | | |
| Atomized [c] | 10.0 | 0 | 10.0 | 0 | 0 | 0 | 0 | 0 | 0 | 0 |
| Ground scrap [d] | 0 | 10.0 | 10.0 | 20.0 | 0 | 20.0 | 30.0 | 40.0 | 50.0 | 0 |
| Coarse ground [e] | 0 | 0 | 0 | 0 | 20.0 | 0 | 0 | 0 | 0 | 0 |
| Petroleum oil,[f] percent | 2.5 | 2.5 | 2.5 | 2.5 | 2.5 | 2.5 | 2.5 | 2.5 | 2.5 | 2.5 |
| DNT (56°), percent | 5.0 | 5.0 | 5.0 | 5.0 | 5.0 | 12.0 | 5.0 | 5.0 | 5.0 | 7.0 |

[a] −6 mesh, 100%; +35, >95%. Bulk d. ≥0.90 g./cc. Moisture content, <0.1%.
[b] −6 mesh, 100%; >60%. Bulk d. >1.0 g./cc. Moisture content, <0.1%.
[c] −40 mesh, 100%; −325, 40%; av. particle size 30±5 microns (U.S.S. sieve).
[d] +28 mesh, 2%; −28+48, 61%; −48+65, 20%; −65+100, 8%; −100+150, 3%; −150+200, 2%; −200+325, 2%; −325, 2%.
[e] −10 mesh, 100%; −10+28, 47.8%; −28+65, 51.2%; −100, 1.0%.
[f] A dark-to-black crude fuel oil having a viscosity above 300 universal Saybolt seconds at 150° F. and a minimum flash point of 320° F. (160° C.).

*Example 2*

The data reported in following Table II are based on underwater detonations of equal-weight explosive charges under like test conditions. The first figures are relative impulse values for the outgoing shock wave produced by several compositions of this invention shown in Table I, when the impulse of the shock wave from the comparative composition, also shown in Table I, is taken as unity. Based on these impulse values, charge weights of the compositions of this invention that will give seismic signals equivalent in amplitude to the comparative composition, taking the charge weight of the latter as unity, also are reported.

The formula designations in Table II refer to those in Table I. Each test of these formulas is conducted with a 10-pound charge packaged in a closed metal can 6½ inches in diameter by 7 inches in length and fitted in one end with a well for a booster charge (ca. 0.6 oz. of a PETN/RDX mixture), into which is inserted an electric blasting cap. The shooting site is a test pond approximately 12 feet in depth. The test instruments include a blast gage for measuring shock wave pressure versus time at a selected horizontal distance from the charge, and impedance-matching amplifiers and an oscilloscope fitted with a camera for detecting, amplifying and recording the pressure signals produced by the explosion. The horizontal measurement interval used for the tests is 5 feet. Prior to each shot, the explosive charge is submerged in the pond and fixed by marked lines so that detonation is reliably conducted at a level 6 feet below the surface of the water and also at a horizontal distance of 5 feet from the blast gage that measures the pressure.

TABLE II

| Formula Designation | Comparative Composition | Composition of this Invention | | | | |
|---|---|---|---|---|---|---|
| | | A | B | C | D | F |
| Relative Impulse | 1 | 1.11 | 1.11 | 1.21 | 1.21 | 1.19 |
| Relative Wt. Giving Equivalent Seismic Signal Amplitude | 1 | 0.85 | 0.85 | 0.74 | 0.74 | 0.76 |

The validity of the relationship reported in Table II between charge weight and amplitude of seismic signal produced by the compositions of this invention, versus the comparative nitro-carbo-nitrate composition, has been confirmed by conducting comparative offshore seismic prospecting trials of the compositions in charge weights up to 50 pounds. Thus, with the compositions of this invention, equivalent seismic performance is achieved with considerably smaller explosive charges than is possible with explosive compositions known and used heretofore in offshort explorations. Conversely, on an equal weight basis, the explosive compositions of the instant invention provide considerably greater seismic return in offshore prospecting than the prior explosive compositions.

Quite surprisingly, field trials also have shown that the compositions of this invention, compared with conventional offshort seismic explosives such as the comparative composition shown above, permit markedly increased submergence. In general, maximum submergence decreases with charge weight. With compositions of this invention, more than 30% greater submergence than that used for the above-mentioned conventional explosive can be employed. For example, charges of such conventional explosives of on the order of 50 pounds usually are detonated at depths about 5 to 6 feet below the water surface, while 33 pound charges of the subject compositions are detonated at about 8 to 9 feet. Fifty (50) pound charges of the instant compositions could be detonated at even greater depths.

Increasing the submergence of an explosive charge increases the duration of seismic output and this, in turn, increases seismic energy return. The increased submergence permissible with the compositions of this invention is particularly surprising in view of the fact that art-recognized relationships dealing with submergence do not indicate any significant variation thereof with composition.

We claim:
1. Improved explosive compositions for seismic prospecting comprising a uniform blend of:
   (a) about from 40 to 85% by weight of particulate ammonium nitrate;
   (b) about from 10 to 50% by weight of particulate aluminum;
   (c) hydrocarbon present in an amount up to about 5% by weight; and
   (d) about from 1 to 10% by weight of nitro compound selected from the group consisting of mononitro and dinitro benzene hydrocarbons, the sum of the weights of components (c) and (d) constituting about from 2 to 15% of the total composition, said explosive compositions having a density of at least 1 gram per cubic centimeter and being insensitive to initiation by a No. 8 blasting cap.

2. An explosive composition of claim 1 wherein (c) is about 1 to 3% of liquid hydrocarbon.

3. An explosive composition of claim 2 wherein the nitro compound is dinitrotoluene.

4. An explosive composition of claim 3 wherein a maximum of about 5% of the aluminum particles are below about 25 microns in size.

5. An explosive composition of claim 4 wherein the aluminum has an average particle size of at least 150 microns.

6. An explosive composition for seismic prospecting which comprises a blend of:
   (a) about from 60 to 85% by weight of a mixture, having a bulk density of at least about 0.9 gram per cubic centimeter, of coarse and fine particulate ammonium nitrate;
   (b) about from 10 to 30% by weight of particulate aluminum having an average particle size of about from 300 to 800 microns;
   (c) about from 1 to 3% of petroleum oil; and
   (d) about from 2 to 8% of nitrotoluene, the sum of the weights of (c) and (d) being about from 3 to 10% by weight of the total composition, said explosive composition having a density of at least 1 gram per cubic centimeter and being insensitive to initiation by a No. 8 blasting cap.

7. In the process for seismic prospecting in land covered by water wherein an explosive charge submerged below the surface of the water is detonated to generate seismic waves in the earth below the water and a portion of the seismic waves returned from the earth are detected, amplified, and recorded, the improvement which comprises using as said explosive charge a uniform blend of:
   (a) about from 40 to 85% by weight of particulate ammonium nitrate;
   (b) about from 10 to 50% by weight of particulate aluminum;
   (c) hydrocarbon present in an amount up to about 5% by weight; and
   (d) about from 1 to 10% by weight of nitro compound selected from the group consisting of mononitro and dinitro benzene hydrocarbons, the sum of the weights of components (c) and (d) constituting about from 2 to 15% of the total composition, said composition having a density of at least 1 gram per cubic centimeter and being insensitive to initiation by a No. 8 blasting cap.

8. A process of claim 7 wherein said explosive charge comprises a blend of:
   (a) about from 60 to 85% by weight of a mixture, having a bulk density of at least about 0.9 gram per cubic centimeter, of coarse and fine particulate ammonium nitrate;
   (b) about from 10 to 30% by weight of particulate aluminum having an average particle size of about from 300 to 800 microns;
   (c) about from 1 to 3% of petroleum oil; and
   (d) about from 2 to 8% of dinitrotoluene, the sum of weights of (c) and (d) being about from 3 to 10% by weight of the total composition, said composition having a density of at least 1 gram per cubic centimeter and being insensitive to initiation by a No. 8 blasting cap.

No reference cited.

LEON D. ROSDOL, *Primary Examiner.*

B. R. PADGETT, *Assistant Examiner.*

PO-1050
(5/69)

UNITED STATES PATENT OFFICE
CERTIFICATE OF CORRECTION

Patent No. 3,263,608　　　　　　　　Dated August 2, 1966

Inventor(s) Alday B. Andrews, Charles D. Forrest and Frank A. Loving, Jr.

It is certified that error appears in the above-identified patent and that said Letters Patent are hereby corrected as shown below:

Column 10, line 23, change "nitrotoluene" to --dinitrotoluene--.

SIGNED AND SEALED
JUL 14 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,263,608      Dated August 2, 1966

Inventor(s) Alday B. Andrews, Charles D. Forrest and Frank A. Loving, Jr

It is certified that error appears in the above-identified patent and that said Letters Patent are hereby corrected as shown below:

Column 10, line 23, change "nitrotoluene" to --dinitrotoluene--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents